Figure 1:
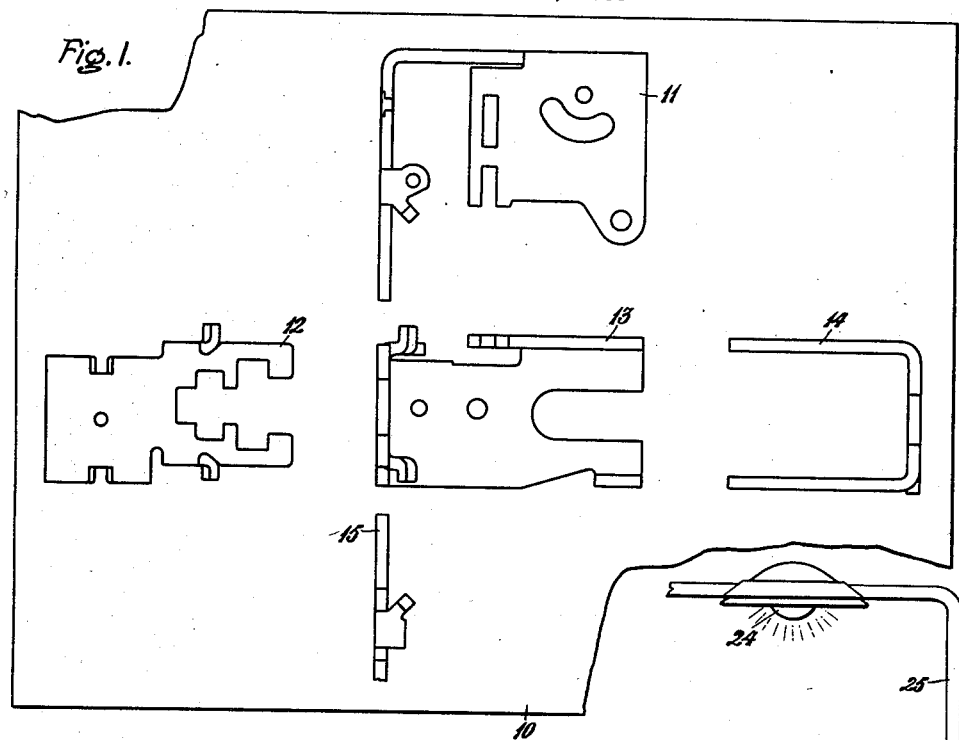

Sept. 12, 1939.     J. B. FORD     2,172,970

METHOD OF MANUFACTURING COOPERATING PUNCHES AND DIES

Filed March 16, 1935

Inventor:
John B. Ford,
by *Harry E. Dunham*
       His Attorney.

Patented Sept. 12, 1939

2,172,970

UNITED STATES PATENT OFFICE 2,172,970

METHOD OF MANUFACTURING COOPERATING PUNCHES AND DIES

John B. Ford, Schenectady, N. Y., assignor to General Electric Company, a corporation of New York Application March 16, 1935, Serial No. 11,455

1 Claim. (Cl. 76—107)

A big item in the manufacturing cost of new devices or articles is the expenditure for tools for producing them. The efficiency of new devices depends to a considerable extent upon their accuracy in dimensions, which in turn is determined at least partly by the accuracy with which tools and like elements used in the manufacture of such devices can be produced. This is especially significant where like devices or articles are produced by separate tools. For example, in the mass-manufacture of laminations for electrical machines two and more punch presses are often operated to produce like laminations. Laminations punched by two and more presses are sometimes assembled in a single electrical machine. All said laminations must be exactly alike to obtain the best efficiency of the machine. The same applies where a single device is produced by several punching operations in progressive steps. Unless the several punching elements used for progressively punching and forming a device are accurate and alike as to certain dimensions, the new device will not be correct in size and form.

According to present-day manufacturing methods, which are almost universally adhered to, a new metallic article or device conceived by a designer is first drawn on paper. This may be considered the first step in the process of manufacturing a new article and a tool or tools for making such article. The drawing is handed to a skilled mechanic who in turn takes a piece of metal from which the article is to be made and lays out the article thereon, using scribers, calipers, compasses and like tools for producing the drawing on the particular metal. In case the article is of uniform thickness and can be presented and fully understood by a single view, the mechanic produces such single view handed to him in the form of a drawing on the piece of metal by means of the aforementioned tools. If, however, several views and sections are necessary to fully present the article by a drawing, then the mechanic does not produce such views on the piece of metal from which the article is to be made but produces on such piece of metal a layout of the article in the form of a development of the drawing, making various corrections and additions with respect to bends and curves of the article to be formed. The producing of a layout on a piece of metal just described may be considered the second step at present generally followed in the method of manufacturing a new article and the tool or tools used in the mass-manufacture of such new article.

The third step in such method of manufacture comprises the separation of the piece of metal along the contours of the layout. To use a simple explanation, it may be said that the layout is cut out from the piece of metal.

My invention relates primarily to the second step of the aforementioned method of manufacture. It will be readily appreciated that in many instances it is rather tedious work to produce a layout of a complicated article on a piece of metal which requires considerable skill on the part of a mechanic. In case two such complicated layouts have to be made, about twice the length of time has to be spent because exactly the same procedure must be repeated, and there is no assurance that the two layouts will be exactly alike.

The general object of my invention is to provide an improved method of manufacturing metallic devices whereby the manufacturing cost is considerably curtailed and greater accuracy is assured.

In accordance with my invention I overcome the drawback of the second step of the aforementioned method of manufacture by producing on thin paper a layout of the device or article to be manufactured and printing the layout on a proper piece of metal from which the article or a tool for use in making the article is to be made. To this end the surface of such piece of metal is provided with a coating of a light-sensitive substance and the layout produced on paper is printed onto the coated surface by any suitable method of printing or engraving.

Figure 3:
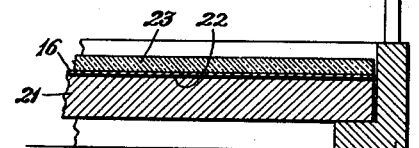
Figure 2:
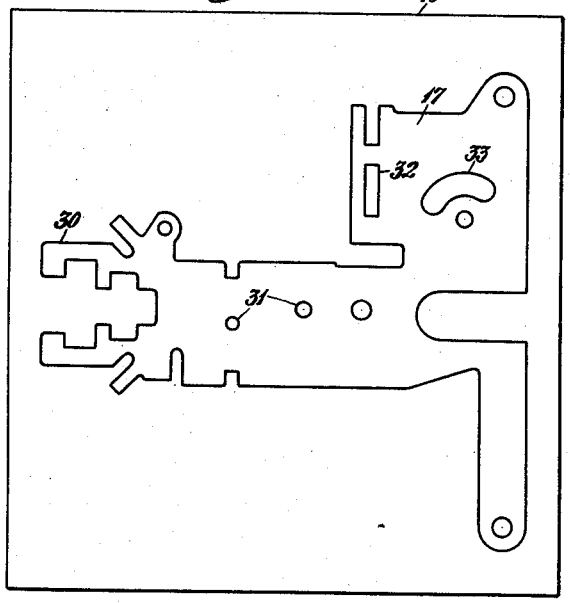
Figure 4:
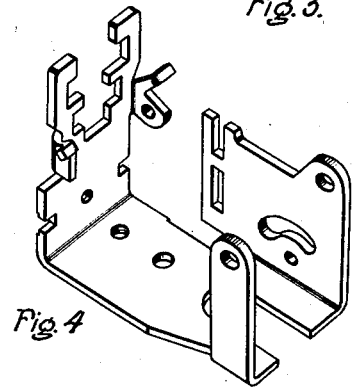

For a better understanding of my invention, attention is directed to the accompanying drawing in which Fig. 1 represents a design of an article to be manufactured; Fig. 2 represents a layout of the design on paper in accordance with my invention; Fig. 3 illustrates an arrangement for printing the layout on a piece of material; and Fig. 4 is a perspective view of the article to be made in accordance with my invention.

Referring now to the drawing, Fig. 1 indicates a piece of drawing paper 10 with five different views, side, plan, rear and front views 11, 12, 13, 14, and 15 of a somewhat complicated article to be manufactured. In accordance with my invention a layout or development of the article is made on thin tracing paper. Fig. 2 indicates a piece of tracing paper 16 with a layout 17 of the article made from the drawing in Fig. 1. In producing this layout, well known rules as to corrections of and additions to the natural dimensions with regard to the particular material and the shape of the article to be made are adhered to. The layout, having been drawn on paper in pencil and checked, is preferably inked in. It forms then a positive from which a print is made on a sensitized piece of material. Any suitable photographic process, such as is common in the manufacture of printing plates, may be used for printing the layout or development on a piece of metal. The surface of the metal on which the layout is printed should be smooth. Such smoothness may be obtained by grinding and other well known methods of smoothing metals. The metal is then cleaned to remove grease and other deposits by means of water and pumice powder. After the surface has been cleaned in this manner it is placed under clean, running water and allowed to rinse for aproximately two minutes. The surface is then sensitized. I have found a good sensitizer in the form of a mixture of 13 oz. of water, 6 oz. of engraving glue and ⅜ oz. ammonium bichromate. Ordinarily, I have found 1 oz. of this mixture sufficient to cover a plate 15" square. The filament or coating of the sensitizer obtained by the above mixture may be controlled by changing the relative amounts of the ingredients of the mixture.

After the metal which in the present instance is in the form of a plate, has been cleaned by water and pumice as outlined above, sensitizing liquid is poured onto the plate. In order to obtain a uniform coating of sensitizer I have found it advantageous to rotate the plate, for instance, by clamping it to a whirler and applying water and sensitizing liquid onto the center of rotation of the plate. The centrifugal force acting on the sensitizer during rotation of the plate causes the sensitizer to spread over the surface of the plate. The sensitized surface then is dried which may be accomplished in a simple manner by the provision of heating units on a cover of the whirler. The sensitized metal plate may be whirled for approximately three minutes to remove surplus sensitizer. To complete drying of the sensitizer on the metal plate, the sensitized metal may be left in the whirler if time permits or it may be removed and placed in a cabinet heated for one hour to approximately 75° C. In the drawing I have not shown a whirler, nor a heating cabinet because such devices are well known and besides, my method does not necessarily depend on the use of such devices.

After the surface or one side of the metal plate has been sensitized and dried, the inked tracing is printed on the sensitized surface. This is done preferably by means of a printing frame 20, Fig. 3. The metal plate 21 with its sensitized coating 22 is put into the printing frame. The tracing 16 is laid onto the coated surface and held in position and flattened out by means of a glass plate 23. The printing frame is then placed in front of a source of light, such as an arc lamp. In the present instance I have shown in Fig. 3 an arc light 24 secured by an arm 25 to the printing frame. The coated surface with the tracing thereon is then exposed for a certain length of time to the arc light. The length of time depends largely upon the thickness of the coating and the kind of sensitizer. In actual practice I have obtained good results by exposures of about ½ to 4 minutes. After the exposure, the metal is removed from the printing frame and washed under clean, running water for about ½ minute. Thereafter the coated surface of the metal is covered with analine dye or methyl violet. The metal is then placed under a stream of cold water to better bring out the lines of the image thereon. Under the stream of cold water the sensitizer, which has not been cured due to the lines on the tracing, is washed away. After this the metal is dried either by heat or air and the remaining glue on the surface is burned in, preferably by means of an electric hot plate or a Bunson burner. The burning darkens the glue to form a dark brown background with white lines on the metal where the sensitizer has been removed. This completes the second step of the process and the piece of metal with the printed layout thereon is now ready to be subjected to the third step of the method of manufacture.

The piece plate or block of metal with the layout printed thereon is now processed by mechanical means, such as sawing, boring and filing machines to remove the material outside and inside the lines confining the element to be produced. Looking at Fig. 2 and considering now the lines 16 as representing a plate or block of metal of desired thickness, the processing of the plate by mechanical means includes the removal of all the material from the block outside the confining line 30 and inside the confining lines and curves 31, 32 and 33 respectively. The element thus produced is formed, that is, certain portions thereof are bent until the element assumes the desired shape of the article as indicated in the perspective view of Fig. 4.

The article is checked preferably by assembling it with cooperating elements or articles. After the article is found correct, a punch and a die are made for producing the article by a punching operation.

In accordance with my invention the punch and die or like tools, necessary in the mass-manufacture of such articles, are made in substantially the same manner as the sample of the article described above. In particular, the same tracing is used. This tracing is printed on a block or blocks of material from which the punch and die are to be made. Depending upon the shape of the article, single or multi-impression punches and dies are made, that is, if the article is simple it is made by a single punch and die and in case the article is complicated it is made by means of several or progressive punches and dies through which the metal plate is passed in consecutive steps as is well known in the art. For example, in the present instance it may be desirable to first punch out a piece of material along the outer confining lines 30 of Fig. 2, and thereafter subject the piece of material to further or progressive punching operations for removing the material within the curves and lines 31, 32 and 33. In all these cases it is important to note that with my invention the same tracing is used for producing the punch and die members or like tools as were first used for producing a sample of the article. It will be readily understood that in this manner considerable time is saved. I have found that in the average it takes less than half the time for producing a layout or development on tracing paper and then printing it on metal than it would take to produce such layout directly on the metal from which the article is to be made. The reason for this saving in time is partly due to the fact that it is much easier to produce a layout on paper than on a piece of metal. Another reason is that the layout on paper usually can be made in a more convenient environment than the layout on metal. With previous methods the time for making the layout which may be several days was almost doubled by producing such layout a second time on a piece or block of metal from which the die and punch was to be made. Now, with my improved method it is only a question of minutes to print the layout a second time or a number of times. Not only is time saved but also greater accuracy is attained because the reproduction of the layout from the same tracing on one or several pieces of metal assures that these reproductions are exactly alike and hence, assures that the punches or like tools made will produce the same article heretofore found satisfactory in sample form.

The greater accuracy attained by my method becomes manifest especially where small, complicated pieces are manufactured. In accordance with my invention in such cases a tracing is made to an enlarged scale, which scale may be for example four times the natural size, or smaller or larger, depending on the accuracy required and the actual size of the element to be manufactured. This enlarged tracing is checked and thereafter reduced by any desirable photographic process to the natural size of the article. With the natural size photographic tracing thus obtained I proceed in the manufacture of the article in the same manner as described above. The accuracy at which the article can be produced with this method is greater. Additional time in this case is saved because it takes less time to make a correct tracing of a small article to an enlarged scale than it takes to make such tracing or layout to scale, that is, to the dimensions of the article.

With my invention, special advantages also are obtained in the manufacture of a series of tools or other devices. By a series of tools I mean a plurality of tools of different size but exactly the same shape. In accordance with my invention, a single layout on tracing paper is made in this case. This layout is reduced or enlarged or both reduced and enlarged by photographic methods to produce layouts of different sizes. These different size layouts then are printed onto a coated surface of a block or blocks of metal from which the series of tools or other devices is to be manufactured. It will be readily understood that such procedure assures exact similarity of the different layouts and accordingly the tools and devices manufactured.

The great advantages of my method in cases like the aforementioned are manifest especially where a series of articles is manufactured, which articles include two or more cooperating elements. In such cases it is preferable to produce first a single article, that is, two cooperative elements, and after these two cooperative elements have been manufactured, checked and found correct, the series of articles is manufactured by first producing layouts of different sizes, using photographic methods to enlarge or reduce or both enlarge and reduce the tracing or layout from which the sample was made. This method assures that the different articles of the series will be exactly similar in shape and that the elements of each article will cooperate.

Greater accuracy is also obtained in the manufacture of tools, such as punches and dies, for producing a plurality of like elements at a single stroke. In such cases a tracing or layout is made of a single element preferably to an enlarged scale. This tracing is reduced in the manner described above and thereafter the tracing is photographed several times on adjacent portions of a piece of metal from which the tool is to be made. The same result may be obtained by photographing the tracing several times on adjacent portions of a sensitized paper and thereafter printing a positive of this paper on a piece of sensitized metal. Like advantages of my improved method as obtained in the manufacture of multiple, combination and progressive dies are apparent in the manufacture of single and multiple cavity moulds.

What I claim as new and desire to secure by Letters Patent of the United States, is:

The method of making cooperating punches and dies which comprises making on thin paper a drawing of the punch, printing the drawing on the sensitized surfaces of at least two pieces of metal, removing from one piece all the metal outside the confines of the print thereon to form a punch, and removing from the other piece all the metal inside the confines of the print thereon to form a die.

JOHN B. FORD.